United States Patent [19]
Wilkens

[11] Patent Number: 5,335,778
[45] Date of Patent: Aug. 9, 1994

[54] RECIPROCATING FLOOR CONVEYOR FLOOR SLAT AND SEAL

[75] Inventor: Arthur L. Wilkens, Osborne, Kans.

[73] Assignee: Wilkens Manufacturing, Inc., Osborne, Kans.

[21] Appl. No.: 36,472

[22] Filed: Mar. 24, 1993

[51] Int. Cl.$^5$ .............................................. B65G 25/00
[52] U.S. Cl. .................................. 198/750; 414/525.1
[58] Field of Search ...................... 198/750; 414/525.1, 414/525.9

[56] References Cited

U.S. PATENT DOCUMENTS

| | | |
|---|---|---|
| 4,144,963 | 3/1979 | Hallstrom . |
| 4,492,303 | 1/1985 | Foster . |
| 4,679,686 | 7/1987 | Foster . |
| 4,727,978 | 3/1988 | Hallstrom, Jr. . |
| 4,749,075 | 6/1988 | Foster . |
| 4,785,929 | 11/1988 | Foster . |
| 4,823,938 | 4/1989 | Foster . |
| 4,858,748 | 8/1989 | Foster . |
| 4,896,761 | 1/1990 | Foster .............. 414/525.1 |
| 4,899,870 | 2/1990 | Foster . |
| 4,940,132 | 7/1990 | Foster . |
| 4,962,848 | 10/1990 | Foster . |
| 4,984,679 | 1/1991 | Foster . |
| 5,064,052 | 11/1991 | Foster .............. 198/750 |
| 5,139,133 | 8/1992 | Foster .............. 198/750 |

*Primary Examiner*—Joseph E. Valenza
*Attorney, Agent, or Firm*—Reising, Ethington, Barnard, Perry & Milton

[57] ABSTRACT

The reciprocating floor conveyor floor slat (50) and seal (102) includes a horizontal upper section (82) with an upper cargo support surface and a bottom surface (90) that is supported by and slides on a bearing surface (56). Slide walls (86) are integral with and extend downwardly from the upper section (82). A lip (94) on one side of the upper section (82) extends outwardly from a side wall (86) and has a downwardly facing sealing surface (108). A seal retainer (96) is integral with the other side wall (86). The seal retainer (96) includes a bore (98) and a slot (100) extending the length of the floor slat (50). The seal (102) includes a base (104) and an integral blade (106). The base (104) is telescopically received in the bore (98) and the blade (106) extends out through the slot (100). The blade (106) of the seal (102) contacts the lower surface (109) of a lip (92), extends across the gap (85) between the floor slat (50) and an adjacent floor slat and contacts the downwardly facing sealing surface (108) on the lip (94) of the adjacent floor slat. Relief areas (105 and 107) are provided between the seal (102) and the seal retainer (96) to reduce the force required to pull a seal (102) into the bore (98) and the slot (100). Flanges (88) are provided on the side walls (86) to limit upward movement of the slat (50) away from the slide bearings (52).

15 Claims, 4 Drawing Sheets

RECIPROCATING FLOOR CONVEYOR FLOOR SLAT AND SEAL

BACKGROUND OF THE INVENTION

This invention relates to reciprocating floor conveyors and more particularly to floor conveyors with seals between the floor slats.

Reciprocating floor conveyors have been used for several years in van bodies and in trailers for unloading cargo. These conveyor systems are widely used for transporting bulk material such as ground plant material for animal feed, saw dust, wood chips, bark and plant material for human consumption. The conveyor systems include a plurality of parallel floor slats. Each floor slat is mounted so that it can slide back and forth in a direction parallel to its long axis.

Several different drives and drive systems have been employed in reciprocating floor conveyors to reciprocate the floor slats back and forth. A commonly used drive system includes three hydraulic cylinders that move all the slats simultaneously to the rear toward a rear discharge, carrying the cargo with them. The first cylinder is connected to and drives every third floor slat. A second cylinder is connected to and drives all the floor slats that are adjacent to a common side of the floor slats attached to the first cylinder. A third cylinder is attached to and drives the floor slats that are between the floor slats driven by the first cylinder and the floor slats that are driven by the second cylinder. The first, second and third cylinders are activated one at a time to move every third floor slat forward and away from the rear discharge without moving cargo forward. The floor slats do not convey cargo when two thirds of the floor slats are stationary while one cylinder moves one third of the floor slats forward. The third cylinder moves the floor slats connected to it forward while the floor slats connected to the first and second cylinders remain stationary. The second cylinder then moves the floor slats connected to it forward while the floor slats connected to the first and third cylinders remain stationary. The first cylinder then moves the floor slats connected to the first cylinder forward while the floor slats connected to the second and third cylinders remain stationary. The above procedure is then repeated to move the cargo through the rear discharge opening. The procedure continues to be repeated until all the cargo is discharged.

Floor slats are commonly made from aluminum or other suitable material. Gaps are provided between aluminum floor slats to accommodate thermal expansion of the floor slats and to prevent galling which can occur when aluminum floor slats are in contact with each other. The gaps between adjacent floor slats in reciprocating floor conveyors create two problems. One of the problems is loss of cargo. This is not a serious problem if the cargo is non-toxic and inexpensive. Loss of cargo is a serious problem, however, if the cargo is a toxic material or if the cargo is expensive. Another problem is cargo contamination. Cargo can be contaminated by water and other material on a road surface that is thrown upwardly by vehicle wheels and passes through slots between the floor slats. Cargo contamination is an extremely serious problem if the cargo is for human or animal consumption.

Two basic types of solutions to the problem caused by the space between the floor slats have been tried. One solution is to catch the material that passes between the floor slats in either direction. This solution adds weight and expense to reciprocating floor conveyor systems. Catching material that passes down between the slats also adds disposal problems if it is necessary to dispose of the material that is caught. Seals between the floor slats have been the preferred solution to the problems. Seals between the floor slats can virtually eliminate cargo loss as well as cargo contamination. Seals between reciprocating floor slats are generally resilient and rely upon their resilience to maintain sealing contact. Seals that can be inflated have also been tried. Inflated seals are deflated during conveying operations.

The seals that are currently in use are carried by one floor slat and are in sliding contact with a vertical or near vertical surface on the side of an adjacent floor slat. These seals are made from materials that have a low coefficient of friction that are tough and that are resilient. The low coefficient of friction is required to minimize the force required to reciprocate the floor slats back and forth and to prolong seal life. The seals must be made of tough material to prolong seal life and to prevent the penetration of cargo. Resiliency is required to accommodate variations in the size of the gap between floor slats and to maintain sealing contact between the seals and the sliding contact surfaces on adjacent floor slats.

The floor slats slide fore and aft on bearings that support and guide each floor slat. These bearings allow limited lateral movement of the floor slats. Cargo can therefore move the floor slats laterally. If the reciprocating floor is slightly lower on one side than on the other the cargo will tend to move the floor slats toward the low side. This results in a decrease in the gap between some floor slats and an increase in the gap between other floor slats. The seals must have the ability to accommodate the changes in the gap between adjacent floor slats. Seals that have been used in the past can accommodate only small changes in the size of the gap between adjacent floor slats.

The seals that are currently in use are compressed when the gap between adjacent floor slats decreases. With a few seal designs a portion of a seal can become pinched between surfaces on adjacent floor slats. The pinching increases the load between seal surfaces and floor slat surfaces. The increased load due to seal compression or due to pinching the seal increases the power required to reciprocate the floor slats and increases wear.

Cold temperatures tend to stiffen resilient seals. It has been found that seals that are stiffened by low temperatures can wear through the side of a floor slat thereby destroying the floor slat in a relatively short period of time.

Abrasive cargo can increase the wear between floor slats and seals that are in sliding contact with surfaces on floor slats. Some parts of floor slats cannot accommodate much wear without the floor slat being essentially destroyed.

Floor slats seal designs that are currently in use generally create a pocket which catches and retains solids and liquids that pass through the space between the upper portions of floor slats. In cold weather the liquid and solids freeze. The frozen liquids and solids exert large forces on some seals due to the expansion of the liquid during freezing, increase the force required to reciprocate the floor slats and increase the wear on the seal contact surfaces and on the seals. The solids held by the frozen liquids also increase wear on the floor slats and the seals if they are abrasive.

SUMMARY OF THE INVENTION

An object of the invention is to provide a reciprocating floor conveyor with an improved seal.

Another object of the invention is to provide a reciprocating floor conveyor with a resilient seal that exerts a substantially constant force on the seal contact surface of an adjacent floor slat and that is substantially independent from variations in the gap between adjacent floor slats.

A further object of the invention is provide a reciprocating floor conveyor with a seal contact surface on the floor slats that can wear without significantly decreasing floor slat strength.

The reciprocating floor conveyor is mounted in and forms the floor of a cargo container. The cargo container is mounted on a truck chassis or forms the body of a trailer. The trailer has a main frame, supported by wheels and tires and adapted to be connected to a tractor fifth wheel at the front. A plurality of cross beams that are transverse to the long axis of the trailer are attached to the main frame. Side walls and a front end wall are attached to and supported by the ends of the cross beams. A pair of doors form a rear wall of the cargo container. The doors are each pivotally attached to one of the side walls.

A plurality of parallel guide beams are attached to the cross beams to guide and support the floor slats. Slide bearings are attached to each guide beam where the guide beam crosses over and is attached to a cross beam. Each floor slat extends substantially the length of the cargo container and is supported by a group of slide bearings that have a common axis that is parallel to the long axis of the container. Sufficient lateral space is provided for the floor slats, to accommodate thermal expansion of the floor slats.

A floor slat drive system is provided which reciprocates the floor slats back and forth to discharge cargo through an opening provided by the hinged doors at the rear of the trailer or van. The drive includes three transverse floor slat drive beams. The first floor slat drive beam is connected to every third floor slat that makes up the A group of floor slats. The second drive beam is connected to every third floor slat that makes up the B group of floor slats and that are adjacent to a common side of the A group floor slats. The third beam is connected to every third floor slat that makes up the C group of floor slats that are each between an A group floor slat and B group floor slat.

A first hydraulic cylinder is attached to the first drive beam to reciprocate the A group of floor slats back and forth. A second hydraulic cylinder is attached to the second drive beam to reciprocate the B group of floor slats back and forth. A third hydraulic cylinder is attached to the third drive beam to reciprocate the C group of floor slats back and forth. During unloading of the cargo container a control system directs hydraulic fluid to the first, second and third hydraulic cylinders to move all three groups of floor slats toward the cargo discharge together. The cargo supported by the floor slats moves toward the cargo discharge with the floor slats. After the A, B and C groups of floor slats reach the rear limit of their travel, the control system directs hydraulic fluid to the third cylinder to move the C group of floor slats forward. After the C group of floor slats reach their limit of forward movement, the control system directs hydraulic fluid to the second cylinder to move the B group of floor slats forward. After the B group of floor slats reach their limit of forward movement, the control system directs hydraulic fluid to the first cylinder to move the A group of floor slats forward. After the A group of floor slats reach their limit of forward movement the control system directs hydraulic fluid to all three hydraulic cylinders to move the A, B and C groups of floor slats together toward the cargo discharge thereby starting the cargo unloading cycle over. The unloading cycle is continued until the cargo is all discharged.

The floor slats are usually made from extruded aluminum. They can also be made from other metals or from resins. Each floor slat includes a generally horizontal upper section with a cargo support surface. Integral side walls extend downwardly from the generally horizontal upper section. Generally horizontal flanges are integral with lower edge of each side wall and extend inwardly toward each other. The integral side walls are spaced inwardly from and parallel to two parallel side surfaces of the horizontal upper section to form a lip on each side of the floor slat extending the length of the floor slat. The lip on one side of each floor slat provides space for a seal retainer that telescopically receives and retains a seal. The lip on the other side of each floor slat has a downwardly facing seal contact surface that is contacted by a seal retained on an adjacent floor slat.

The forgoing and other objects, features and advantages of the present invention will become apparent in light of the following detailed description of an exemplary embodiment thereof, as illustrated in the accompanying drawing.

DESCRIPTION OF THE PREFERRED EMBODIMENT

Figure 1:
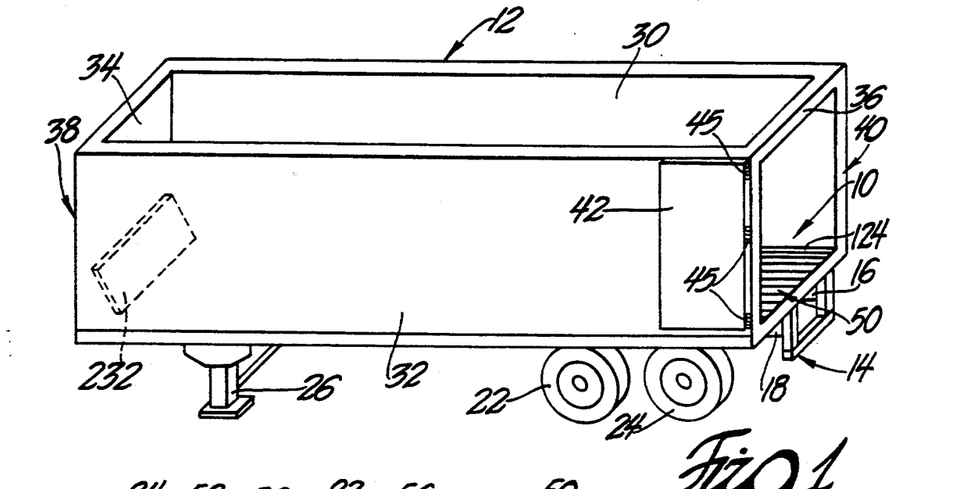
FIG. 1 is a perspective view of a semi-trailer employing a reciprocating floor conveyor for transporting cargo.

The reciprocating floor conveyor 10 is shown in the drawing as part of a semi-trailer 12. The reciprocating floor conveyor 10 could also be part of a van body mounted on a truck chassis. The semi-trailer 12, as shown in FIG. 1 has a main frame 14 which includes a pair of spaced apart channel members 16 and 18 that are parallel to a central axis 20 running the length of the semi-trailer. The rear portion of the semi-trailer 12 is supported by wheels and tires 22 and 24 that are rotatably journaled on conventional axes that are attached to the main frame 14 by a suspension system. The front portion of the semi-trailer 12 is supported by an adjustable landing gear 26. A hitch pin, not shown, for attaching the semi-trailer to a fifth wheel on a tractor is attached to the bottom side of the main frame 14 on the center line 20 of the semi-trailer 12 forward of the landing gear 26. The channel members 16 and 18 end at a point to the rear of the hitch pin and are indirectly attached to the hitch pin to keep the height of the reciprocating floor conveyor 10 at the front of the semi-trailer 12 at about the same height as the height of the reciprocating floor conveyor at the rear of the semi-trailer.

A plurality of cross beams 28 that are transverse to the center line 20 are attached to the main frame 14. The cross beams 28, as shown, are aluminum I-beams. The spacing of the cross beams 28 depends upon the intended use and the cargo the reciprocating floor conveyor 10 is to support. The cross beams 28 have been place on twelve inch centers in some semi-trailers 12. In other semi-trailers 12 the center lines of the cross beams 28 have been as much as fifteen inches apart.

The right side wall 30 is attached to the right hand ends of cross beams 28. A left side wall 32 is attached to the left hand ends of the cross beams 28. A front end wall 34 is attached to the right side wall 30, the left side wall 32 and to the front portion of the main frame 14. The top and bottom of the right side wall 30, the left side wall 32 and the front end wall 34 are reinforced to provide structural integrity. A cross beam 36 is connected to the top of the right side wall 30 and the left side wall 32 at the rear of the semi-trailer 12 to reinforce the cargo container 38 and to define a rear discharge opening 40 that is substantially the same height and width as the cargo container 38. Doors 42 and 44 for closing the discharge opening 40 are attached to the right side wall 30 and the left side wall 32 by hinges 45. The top of the semi-trailer 12 is open for depositing cargo in the cargo container 38.

A plurality of guide beams 46 that are parallel to the center line 20 are welded to the tops of the cross beams 28. The guide beams 46 are square tubes that extend substantially the entire length of the semi-trailer 12. The guide beams 46 each have an end that is adjacent to the front end wall 34 and an end that is adjacent to the doors 42 and 44 when the doors are closing the rear discharge opening 40. There is a section removed from each guide beams 46 in the center portion of the semi-trailer 12 for the floor slat drive assembly 48. The guide beams 46 are on centers that are spaced apart a distance that is slightly more than the width of the floor slats 50. If the width of the floor slat 50 is 3.610 inches, center lines of the guide beams 46 may, for example, be 3.650 inches apart. This provides a nominal gap of 0.04 inches. The number of guide beams 46 required depends upon the inside width of the cargo container 38 and the width of the floor slats 50. In some reciprocating floor conveyors 10, twenty four or even more guide beams 46 are required. Reciprocating floor conveyors 10 with wide floor slats 50 have been used which employ two spaced guide beams 46 for each floor slat.

slide bearings 52 are attached to the guide beams 46 at each point where the guide beam 46 is welded to a cross beam 28. The slide bearings 52 which are made from a thermoplastic resin, such as alatron, have an upper section 54 with a flat bearing surface 56. Two spaced apart vertical side plates 58 and 60 extend downwardly from the upper section 54 and define a guide beam passage 62.

Two ears 64 on the bottom of the vertical side plate 58 extend under the guide beam 46 and to ears 66 on the bottom of the vertical side plate 60 extend under the guide beam 46 to retain the slide bearings 52 on the guide beams 46. One of the ears 64 and one of the ears 66 are adjacent to the front side of the cross beam 28 to prevent movement of the slide bearing 52 to the rear on the guide beam 46. The other ear 64 and the other ear 66 are adjacent to the rear side of the cross beam 28 to prevent movement of the slide bearing 52 to the front on the guide beam 46. A flange 68 with a horizontal floor hold down surface 70 extends outwardly from the vertical side plate 58. A flange 72 with a horizontal floor hold down surface 74 extends outwardly from the vertical side plate 60. A flange 76 with a horizontal floor support surface 78 extends outwardly from the vertical side plate 58 and is in contact with and supported by an upper surface of a cross beam 28. A flange 80 with a horizontal floor/support surface 81 extends outwardly from the vertical side plate 60 and is in contact with and supported by an upper surface of a cross beam 28.

Figure 4:
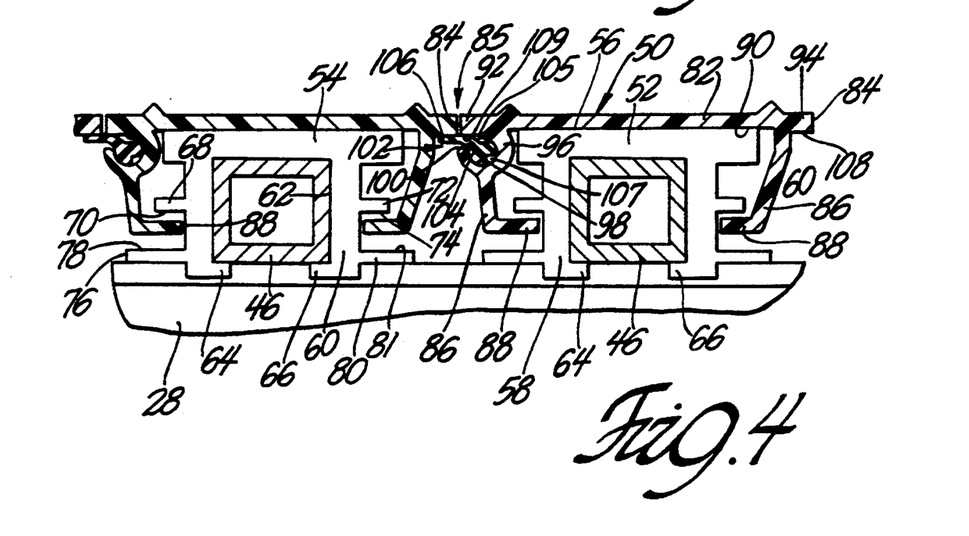
FIG. 4 is an enlarged sectional view of a portion of the reciprocating floor structure including floor slats taken along line 4—4 in FIG. 2.
Figure 5:
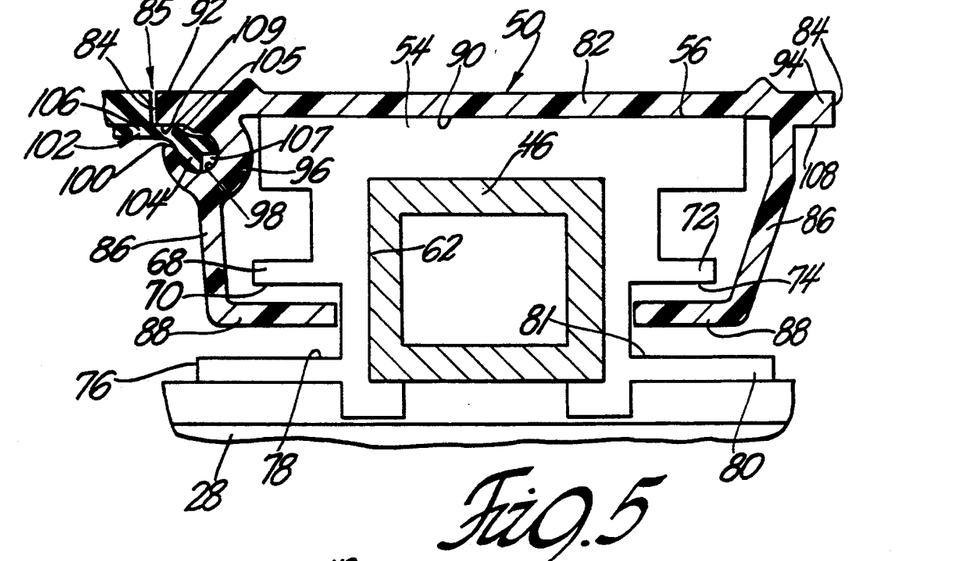
FIG. 5 is an enlarged sectional view taken along line 4—4 in FIG. 2 of one floor slat and a portion of a second floor slat.

The floor slats 50, as shown in FIG. 4, are extruded aluminum members with a horizontal upper section 82. Both sides of the horizontal upper section 82 have generally vertical side surfaces 84. The generally vertical side surfaces 84 on the floor slats 50 are normally spaced from the vertical surfaces on adjacent floor slats by 0.04 inches, as set forth above, to provide a gap 85, as shown in FIG. 4. The vertical side surfaces 84 also function as bearing surfaces when they are in contact with the vertical side surfaces on adjacent floor slats 50. The vertical surfaces 84 on adjacent floor slats may contact each other when cargo that is being supported by the floor slats moves one or more floor slats toward a side of the semi-trailer 12. Integral side walls 86 extend downwardly from the upper section 82. A generally horizontal flange 88 is integral with the lower edge of each side wall 86. The generally horizontal flanges 88 extend inwardly toward each other. The side walls 86 of the floor slats 50, shown in FIG. 4, are inset from the vertical side surfaces 84 to form a lip 92 on one side and a lip 94 on the other side.

The bottom surface 90 of the horizontal upper section 82 of each of the floor slats 50, as shown in FIG. 4, contacts and slides on the flat bearing surface 56 on the upper section 54 of the slide bearings 52. The weight of cargo supported by each floor slat 50 is transferred directly to the slide bearings 52 through the contact between the bottom surface 90 and the flat bearing surface 56. The generally horizontal flanges 88 on the floor slats 50 are positioned between the floor slat hold down surfaces 70 and 74 and the slat support surfaces 78 and 81 on the slide bearings 52. One purpose of the generally horizontal flanges 88 on the floor slats 50 is to contact the slat hold down surfaces 70 and 74 on the slide bearings 52 to prevent the floor slats from lifting up off the flat bearing surface 56 more than a short distance and interfering with reciprocating movement of the floor slats. Another purpose of the generally horizontal flanges 88 on the floor slat 50 is to contact the floor slats support surfaces 78 or 81 on the slide bearings 52 to prevent rotation of a floor slat about an axis running the length of the floor slat. The floor slat support surfaces 78 and 81 on the slide bearings 52 can also cooperate with and support the generally horizontal flanges 88 on the floor slats 50 to limit deflection of the horizontal upper section 82 when the floor slats are over loaded. During normal operation and use of the floor slats 50, the generally horizontal flanges 88 are out of contact with the slide bearings 52 and the various surfaces on the slide bearings.

One side wall 86 of each floor slat 50 has an integral seal retainer 96. The integral seal retainer 96 is formed in the upper portion of the side wall 86 adjacent to the horizontal upper section 82. The integral seal retainer 96 has a generally circular bore 98 running the length of floor slat 50. A slot 100 running the length of the floor slat 50 opens up one side of the generally circular bore 98.

A seal 102 made from a rubber material or a plastic material seals the gap 85 between floor slats 50 to prevent loss of cargo and to prevent contamination of cargo. The seal 102 includes an enlarged base 104 and an integral blade 106. The base 104 is telescopically received in the generally circular bore 98 of the integral seal retainer 96 with a blade 106 projecting laterally through the slot 100. The blade 106 projects outwardly through the slot 100 and into sealing contact with the downward facing sealing surface 108 on the lip 94 of the adjacent floor slat 50. The blade 106 is also in contact with the lower surface 109 of the lip 92 above the integral seal retainer 96. The blade 106 of the seal 102 reduces space for holding liquids and foreign material to a minimum by being in substantially continuous contact with the lower surface 109 of the lip 92 as well as with the downward facing sealing surface 108 on the lip 94 of an adjacent floor slat 50. Small relief areas or voids 105 and 107 between the seal and the seal retainer 96 reduce the force required to pull the seal 102 into the bore 98. With floor slats 50 in long trailers approaching 50 feet in length, it is necessary to reduce the force required to pull a seal 102 into the bore 98. The only space available that can receive and hold liquids, particles of cargo and foreign materials is in the gap 85 between the generally vertical side surfaces 84 on the sides of the horizontal upper section 82 of adjacent floor slats 50. The gap 85 is small and is open at the top. When liquid in the gap 85 expands due to freezing it tends to expand upwardly and out of the gap. Liquid and solids which freeze in the gap 85 have minimal affect on the seal 102. During reciprocating movement of the floor slats 50 relative to each other frozen material in the gap 85 is broken up and moved out of the gap.

The integral blade 106 of the seal 102 is in sliding contact with the downwardly facing sealing surface 108 on the lip 94 of an adjacent floor slat 50. The vertical position of the downward facing sealing surface 108 is fixed by the slide bearings 52 and remains substantially constant while there is cargo supported on the floor slats 50. The downward facing sealing surface 108 can move laterally as well as parallel to the long axis of an adjacent floor slat without compressing the seal 102 or changing the capability of the seal 102 to seal the gap 85. The seal 102 leaves the floor slats 50 free to float laterally on the slide bearings 52.

The lip 94 has a substantially vertical thickness. The downward facing sealing surface 108 can wear substantial due to rubbing contact with the integral blade 106 of a seal 102 without significantly changing the ability of the seal to prevent cargo loss and contamination or changing the strength of the floor slats 50.

Figure 2:
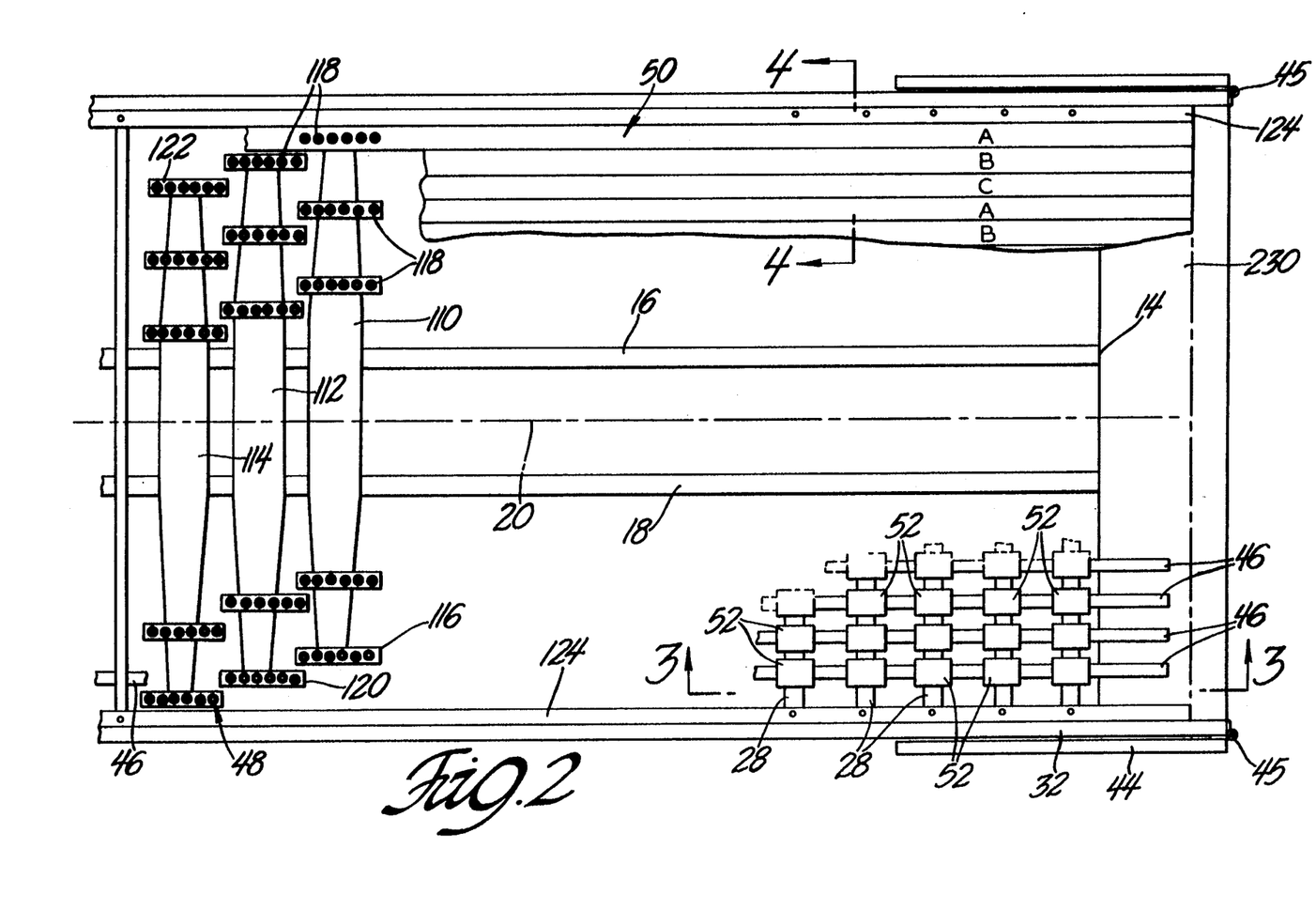
FIG. 2 is a plan view of a portion of the reciprocating floor conveyor in a semi-trailer with some parts removed and other parts broken away to show the construction.
Figure 3:
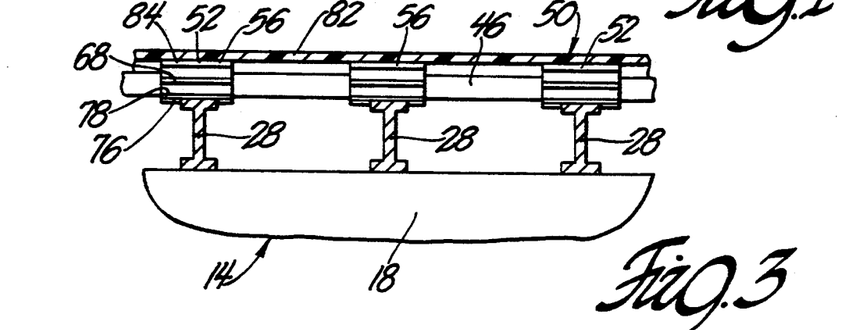
FIG. 3 is an enlarged sectional view of a portion of a reciprocating floor conveyor taken along lines 3—3 in FIG. 2.

The floor slat drive assembly 48 includes transverse drive beams 110, 112 and 114. The transverse drive beam 110 has a plurality of spaced apart floor slat connectors 116 that are connected to each A floor slat 50 by bolts 118. The transverse drive beam 112 has a plurality of spaced apart floor slat connectors 120 which are connected to each B floor slat 50 by bolts 118. The B floor slats 50, as shown in FIG. 2, are on the left hand side of each A floor slat. The transverse drive beam 114 has a plurality of spaced apart floor slat connectors 122 which are connected to each C floor slat 50 by bolts 118. The C floor slats 50 are positioned between each A floor slat and B floor slat. At the right and left edges of the reciprocating floor conveyor 10 adjacent to the right side wall 30 and left side wall 32 is a non-reciprocating half floor slat 124. The half floor slat 124 has been cut through the horizontal upper section 82 along its entire length. The left half of the half floor slat 124 is bolted to the cross beams 28 adjacent to the right side wall 30 with its integral left side wall 86 to the left. The right half of the floor slat 124 is bolted to the cross beams 28 adjacent to the left side wall 32 with its integral side wall 86 to the right. The two half floor slats 124 can be adjusted horizontally toward and away from the center line 20 of the trailer to set the gaps 85 between the floor slats 50. The horizontal adjustment of the half floor slats 124 toward and away from the center line 20 can be made at the time of assembly or slots can be provided for the bolts that secure the half floor slats to the cross beams 28 to facilitate field adjustment. The floor slats 50 can float laterally within limits on the slide bearings 52 toward and away from the center line 20.

Figure 6:
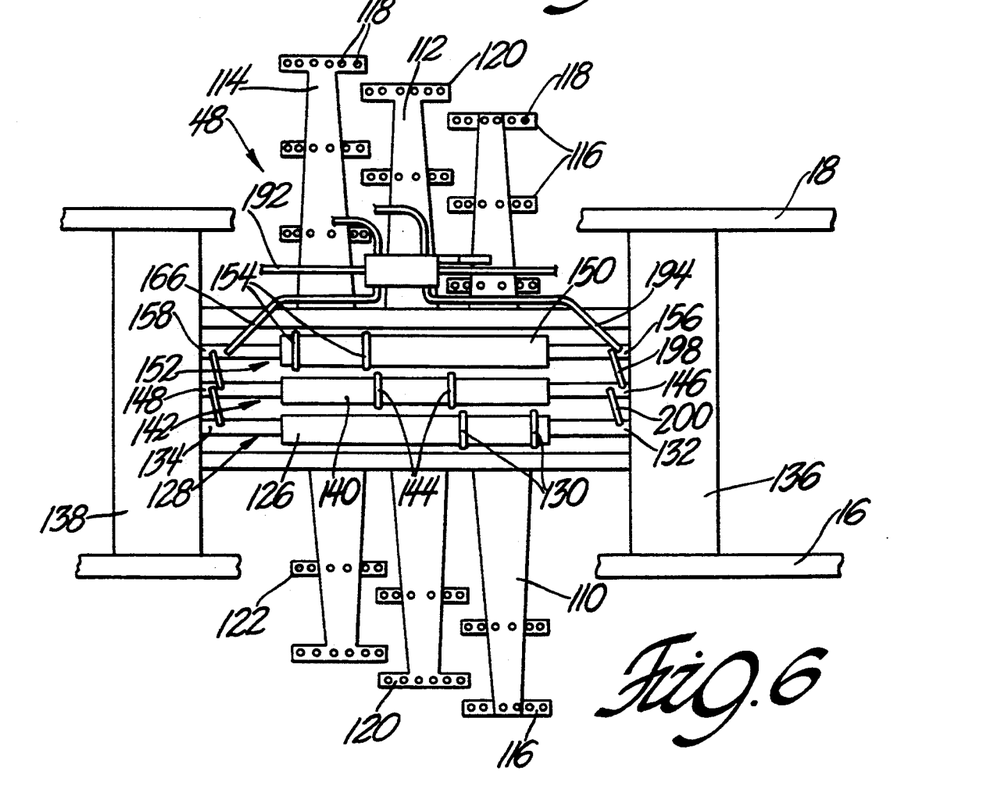
FIG. 6 is a bottom view of a floor slat drive.

The transverse drive beam 110, as shown in FIG. 6, is clamped to the cylindrical barrel 126 of hydraulic cylinder assembly 128 by u-clamps 130. The hydraulic cylinder assembly 128 has two piston rods 132 and 134 which are fixed to cross beams 136 and 138 that are secured to the spaced apart channel members 16 and 18 forward of the wheel and tires 22 and 24 and to the rear of the landing gear 26 and the hitch pin for attaching the semi-trailer 12 to a fifth wheel. Hydraulic fluid under pressure is supplied to the hydraulic cylinder assembly 128 to move the A floor slats 50 back and forth. The transverse drive beam 112 is clamped to the cylindrical barrel 140 of the hydraulic cylinder assembly 142 by u-clamps 144. The hydraulic cylinder assembly 142 has two piston rods 146 and 148 which are fixed to the cross beams 136 and 138. Hydraulic fluid under pressure is supplied to the hydraulic cylinder assembly 142 to move the B floor slats 50 back and forth. The transverse drive beam 114 is clamped to the cylindrical barrel 150 of a hydraulic cylinder assembly 152 by u-clamps 154. The hydraulic cylinder assembly 152 has two piston rods 156 and 158 which are fixed to cross beams 136 and 138. Hydraulic fluid under pressure is supplied to the hydraulic cylinder assembly 152 to move the C floor slats 50 back and forth.

Figure 7:
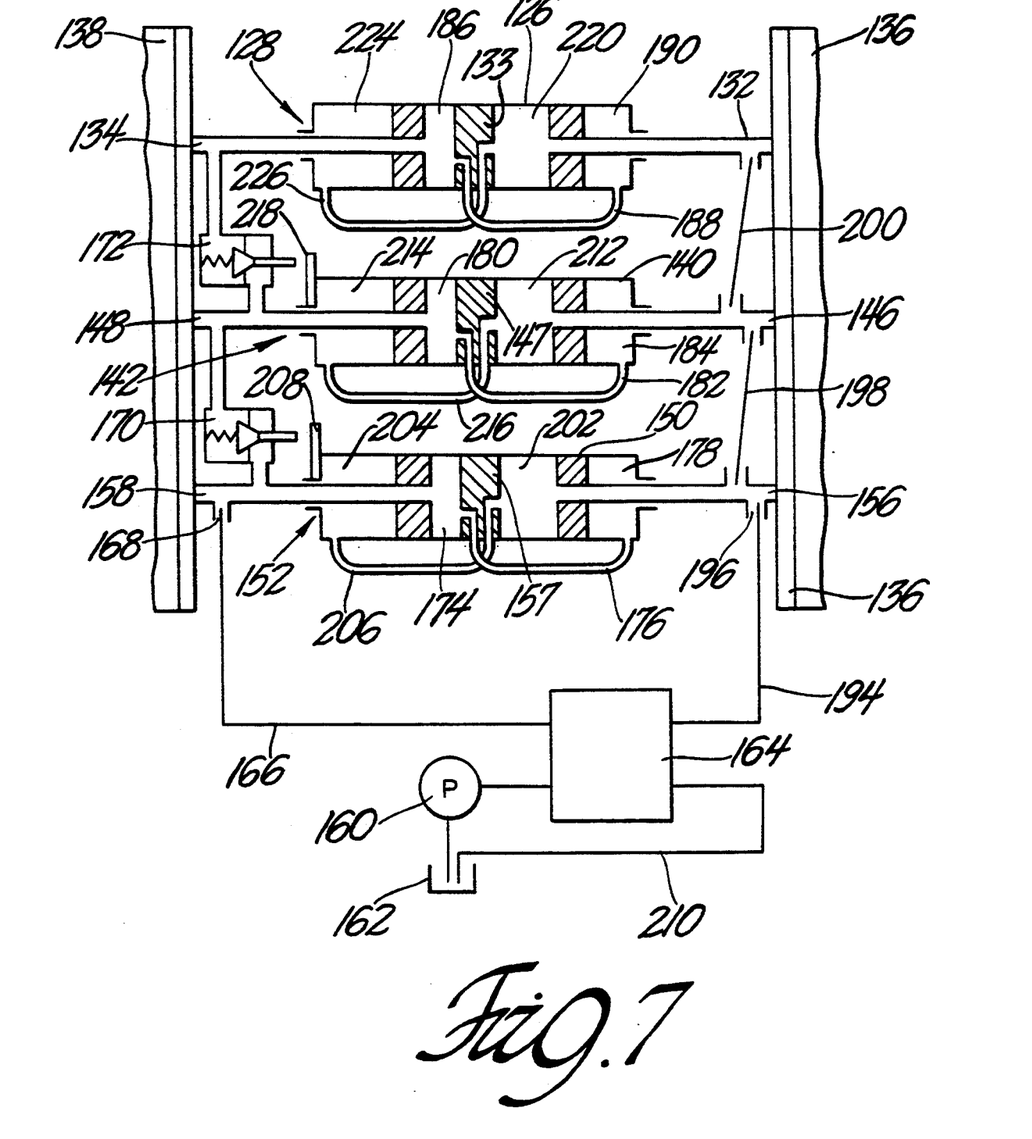
FIG. 7 is a schematic view of a floor slat drive system.

Hydraulic fluid is supplied to the hydraulic cylinder assemblies 128, 142 and 152 by a hydraulic pump 160 shown schematically in FIG. 7. Hydraulic pump 160 draws hydraulic fluid from a sump 162 and supplies the hydraulic fluid to a switching valve 164. The switching valve 164 supplies hydraulic fluid from the hydraulic pump 160 to conduit 166 and port 168. Pressure of hydraulic fluid at the port 168 opens valves 170 and 172 so that hydraulic fluid under pressure is supplies simultaneously to hydraulic cylinder assemblies 128, 142 and 152 to move all the floor slats 50 to rear together. Hydraulic fluid supplied to the hydraulic cylinder assembly 152 through the piston rod 158 flows into a chamber 174 and through a passage 176 to a chamber 178 and moves the cylindrical barrel 150 to the rear toward the cross beam 136. Hydraulic fluid under pressure from the port 168 passes through open valve 170 and through the piston rod 148 of the hydraulic cylinder 142. Hydraulic fluid supplied to the hydraulic cylinder assembly 142 through the piston rod 148 flows into a chamber 180 and through a passage 182 to a chamber 184 and moves the cylindrical barrel 140 to the rear toward the cross beam 136. A portion of hydraulic fluid under pressure from the port 168 that passes through the open valve 170 also passes through the open valve 172 and to the piston rod 134 of the hydraulic cylinder assembly 128. Hydraulic fluid supplied to the hydraulic assembly 128 through the piston rod 134 flows into chamber 186 and through a passage 188 to a chamber 190 and moves the cylindrical barrel 126 to the rear toward the cross beam 136. The pistons on the ends of the piston rods 132, 134, 146, 148, 156 and 158 are fixed to the piston rods and the cross beams 136 and 138 and do not move. The cylinder dividing walls 133, 147, and 157 are fixed to the cylindrical barrels 126, 140 and 150 and move with the cylindrical barrels. The switch valve 146 is connected to the transverse drive beam 110 and reverses the flow of hydraulic fluid from the hydraulic pump 160 when the valve rod 192 shown in FIG. 6 strikes the cross beam 136.

The delivery of hydraulic fluid under pressure from the hydraulic pump 160 through the conduit 194 and the port 196 supplies hydraulic fluid to the piston rod 156, to the piston rod 146 through the conduit 198 and to piston rod 132 through conduit 200. The piston rod 156 supplies hydraulic fluid to chamber 202 and to chamber 204 through conduit 206. This moves the cylindrical barrel 150 of the hydraulic cylinder assembly 152 forward toward the cross beam 138. The hydraulic cylinder assemblies 142 and 128 remain stationary because the valves 170 and 172 are closed and fluid is locked in the chambers 180, 184, 186 and 190. When the cylindrical barrel 150 approaches the forward end of its movement a projection 208 on the cylindrical barrel 150 opens the valve 170. Opening the valve 170 allows fluid to return to the sump 162 from the chambers 180 and 184 and that allows hydraulic fluid under pressure supplied to the piston rod 146 to enter chamber 212 and the chamber 214 through a conduit 216 and force the cylindrical barrel 140 to move forward. When the cylindrical barrel 140 of hydraulic cylinder assembly 142 approaches the forward end of its movement a projection 218 on the cylindrical barrel 140 opens the valve 172. Opening the valve 172 allows fluid to return to the sump 162 from the chambers 186 and 190 and that allows hydraulic fluid under pressure supplied to the piston rod 132 to enter chamber 220 and the chamber 224 through a conduit 226 and force the cylindrical barrel 126 to move forward toward the cross beam 138. When the cylindrical barrel 126 of the hydraulic cylinder assembly 128 reaches the forward end of its travel switching valve rod 192 contacts the cross beam 138 and reverses the flow of hydraulic fluid from the hydraulic pump 160 and connects the port 196 and the conduit 194 to the conduit 210 and the sump 162. When the port 196 is connected to the sump 162 the chambers 202, 204, 212, 214, 220 and 224 are also connected to sump 162. The floor slat drive assembly 48 then repeats the cycle.

The hydraulic system shown schematically in FIG. 7 is one of several systems that are available and that have been used in reciprocating floor conveyors 10. There are other systems for reciprocating floor slats that will work. For example, it is possible to drive two groups of floor slats to the rear simultaneously while one group of floor slats moves forward. With this system the group of floor slats that reaches this forward limit of travel and a group of floor slats that reach their rear limit of travel reverse directions and the third group of floor slats continues to move to the rear. There are also systems which divide the floor slats into more than three groups.

A flat plate 230 is mounted under the rear ends of the floor slats 50 at the rear cargo discharge opening 40. The flat plate 230 extends forward from the rear most position of the floor slats 50 a distance that exceeds the maximum distance the floor slats are capable of being moved by the floor slat drive assembly 48. The guide beams 46 extend over the top of the flat plate 230 and are preferably anchored to the flat plate. During operation of the reciprocating floor conveyor 10 cargo is carried up to the rear discharge opening 40. The floor slats are then moved forward in groups without moving the cargo forward and the cargo is placed on the flat plate 230. The slats 50 then convey more cargo to the rear and push the cargo on the flat plates 230 through the discharge opening 40.

A slant board 232 is attached to the front end wall 34 and extends from the right side wall 30 to the left side wall 32. The upper edge of the slant board is flush with the inside surface of the front end wall 34. The slant board 232 extends downwardly and rearwardly from the upper edge to a bottom edge that is adjacent to the upper surface of the floor slats 50 and that is to the rear of the rear most position of the front end surfaces of the floor slats 50.

Preferred embodiments of the invention have been described in detail but are examples only and the invention is not restricted thereto. It will be easily understood by those skilled in the art that modifications and variations can easily be made within the scope of this invention.

I claim:

1. A reciprocating floor conveyor having a floor slat support and guide assembly, a plurality of side by side parallel floor slats supported by the floor slat support and guide assembly and a drive assembly for reciprocating the floor slats back and forth on the floor slat support assembly to convey cargo supported by the floor slats toward one end of the floor slats and wherein the floor slats are elongated members each having a cargo support surface, a lip with a downwardly facing sealing surface on one side of and extending the length of the cargo support surface, and a seal including a resilient material secured to the other side of each floor slat that is in contact with the downwardly facing sealing surface on the lip of an adjacent floor slat and wherein the seal slides on the sealing surface on said lip during reciprocating movement of adjacent floor slats and said seal seals between two adjacent floor slats when the slats are stationary relative to the floor slat support and guide assembly as well as when the floor slats are reciprocated by said drive assembly to convey cargo.

2. A reciprocating floor conveyor as set forth in claim 1 wherein the seal includes a base secured to a floor slat and a resilient blade integral with said base that spans a gap between two adjacent floor slats, contacts the downward facing sealing surface on the lip of an adjacent floor slat and that is held in sealing contact with said sealing surface by the resilience of the material from which said blade is made.

3. A reciprocating floor conveyor as set forth in claim 1 wherein the downwardly facing sealing surface is in a generally horizontal plane.

4. A reciprocating floor conveyor as set forth in claim 2 wherein the blade of the seal is in contact with a downwardly facing surface on the floor slat to which the seal is attached, spans the gap between two floor slats and contacts the downwardly facing sealing surface on the lip of an adjacent floor slat.

5. A reciprocating floor conveyor as set in claim 2 wherein each elongated floor slat has a seal retainer with a bore and a slot on one side of the bore and the bore and slot extend the length of the elongated floor slat, and wherein the base of the seal is telescopically received in the bore and the blade integral with the base projects through the slot.

6. A reciprocating floor conveyor as set forth in claim 5 wherein relief areas are provided between the seal and the seal retainer to facilitate insertion of the seal in the bore and the slot.

7. An elongated floor slat for a reciprocating floor conveyor with a plurality of side by side parallel floor slats, including a horizontal upper section with a cargo support surface and a bottom surface for contacting and sliding on a bearing surface, side walls that extend downwardly from the upper section, a lip on one side of the upper section with a downwardly facing sealing surface, a seal retainer integral with the side wall on the opposite side of the floor slat from the lip with a downwardly facing sealing surface, and a seal with a base secured in the seal retainer and a resilient blade that projects outwardly from the side of the floor slat to contact a downwardly facing sealing surface on an adjacent floor slat to seal between two slats when the floor slats are fixed relative to each other and to seal between two floor slats and slide on said downwardly facing sealing surface when the floor conveyor is conveying.

8. An elongated floor slat for a reciprocating floor conveyor as set forth in claim 7 including a lip on the other side of the upper section with a lower surface that is in sealing contact with the blade of the seal.

9. An elongated floor slat for a reciprocating floor conveyor as set forth in claim 8 wherein the seal retainer includes a bore and a slot the length of the floor slat, the base of the seal is retained in the bore and the blade of the seal extends outwardly through the slot.

10. An elongated floor slat for a reciprocating floor conveyor as set forth in claim 8 wherein the downwardly facing sealing surface on the lip on one side of the upper section is in a generally horizontal plane.

11. An elongated floor slat for a reciprocating floor conveyor as set forth in claim 9 wherein relief areas are provided between the seal and the seal retainer to facilitate telescopic insertion of the seal base in the seal retainer bore.

12. An elongated floor slat for a reciprocating floor conveyor as set forth in claim 9 wherein the floor slat is extruded aluminum.

13. An elongated floor slat for a reciprocating floor conveyor as set forth in claim 7 wherein the seal is a rubber compound.

14. An elongated floor slat for a reciprocating floor conveyor as set forth in claim 7 wherein the side walls have flanges that limit vertical movement of the elongated floor slat.

15. An elongated floor slat for a reciprocating floor conveyor with a plurality of side by side parallel floor slats, including a horizontal upper section with a cargo support surface and a bottom surface for contacting and sliding on a bearing surface, side walls that extend downwardly from the upper section, a lip on one side of the upper section with a downwardly facing sealing surface in a generally horizontal plane, a seal retainer integral with the side wall on the opposite side of the floor slat from the lip with a downwardly facing sealing surface, a seal with a base secured in the seal retainer and a blade that projects outwardly from the side of the floor slat to contact a downwardly facing sealing surface on an adjacent floor slat, and a lip in the other side of the upper section with a lower surface that is in sealing contact with the blade of the seal.

* * * * *